United States Patent
Ackerman et al.

(10) Patent No.: US 10,877,495 B2
(45) Date of Patent: Dec. 29, 2020

(54) PRESSURE LOADED REGULATOR WITH DUAL DIAPHRAGM AND REDUNDANT SEAL

(71) Applicant: EMERSON PROCESS MANAGEMENT REGULATOR TECHNOLOGIES, INC., McKinney, TX (US)

(72) Inventors: Neal A. Ackerman, McKinney, TX (US); Timothy R. Hawkins, Leonard, TX (US); Tony A. Durant, McKinney, TX (US); Jason D. Journey, Plano, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 0 days.

(21) Appl. No.: 15/915,676

(22) Filed: Mar. 8, 2018

(65) Prior Publication Data
US 2019/0278308 A1  Sep. 12, 2019

(51) Int. Cl.
*F16K 31/12* (2006.01)
*G05D 16/06* (2006.01)
(Continued)

(52) U.S. Cl.
CPC ....... *G05D 16/0669* (2013.01); *F16K 35/022* (2013.01); *F16K 35/16* (2013.01);
(Continued)

(58) Field of Classification Search
CPC ........... F16K 31/1268; Y10T 137/7781; Y10T 137/7834; Y10T 137/7836
(Continued)

(56) References Cited

U.S. PATENT DOCUMENTS 4,684,106 A * 8/1987 Kolenc .................. F16K 37/00
                                                      251/335.1
5,076,320 A * 12/1991 Robinson ............... F02M 69/54
                                                      137/454.2
(Continued)

FOREIGN PATENT DOCUMENTS

DE        19814744 A1    10/1999
EP         2693051 A1     2/2014

OTHER PUBLICATIONS

International Search Report and Written Opinion for PCT/US2019/0020877, dated Jul. 8, 2019.

*Primary Examiner* — Robert K Arundale
(74) *Attorney, Agent, or Firm* — Marshall, Gerstein & Borun LLP (57) ABSTRACT

A fluid regulator includes a regulator body having a fluid inlet and a fluid outlet connected by a fluid flow path, with a portion of the regulator body forming a first chamber, an orifice disposed in the fluid flow path, a seat, and a control element disposed within the fluid flow path and shiftable between an open position spaced away from the seat and a closed position seated against the seat, with the control element arranged to respond to fluid pressure changes to control flow of a process fluid through the orifice. A diaphragm has a radially inner portion that is operatively coupled to the control element and a radially outer portion that is operatively coupled to the regulator body. The diaphragm includes a resilient redundant diaphragm sandwiched between two metal diaphragms, the diaphragm providing two separate seals.

18 Claims, 5 Drawing Sheets

(51) Int. Cl.
    *F16K 35/02* (2006.01)
    *F16K 35/16* (2006.01)
(52) U.S. Cl.
    CPC ..... *G05D 16/0633* (2013.01); *G05D 16/0655* (2013.01); *Y10T 137/7781* (2015.04); *Y10T 137/7836* (2015.04)
(58) Field of Classification Search
    USPC .............................................. 251/331, 335.2
    See application file for complete search history.

(56) References Cited

U.S. PATENT DOCUMENTS

| | | | | |
|---|---|---|---|---|
| 5,108,069 A * | 4/1992 | Tada | ......................... | F16K 7/16 251/263 |
| 5,197,638 A * | 3/1993 | Wood | .................... | B65D 35/20 137/510 |
| 5,335,691 A * | 8/1994 | Kolenc | .................... | F16K 7/12 137/312 |
| 5,413,311 A * | 5/1995 | Arstein | .................... | F16K 7/16 251/229 |
| 5,492,146 A * | 2/1996 | George | ............. | G05D 16/0655 137/505.41 |
| 5,901,742 A * | 5/1999 | Kleppner | ............... | F02M 69/54 137/508 |
| 6,341,758 B1 * | 1/2002 | Shih | ......................... | F16K 7/14 251/129.01 |
| 8,256,744 B2 * | 9/2012 | Tanikawa | .................. | F16J 3/02 251/331 |
| 2015/0034178 A1 | 2/2015 | Vasquez et al. | | |

* cited by examiner

PRESSURE LOADED REGULATOR WITH DUAL DIAPHRAGM AND REDUNDANT SEAL

FIELD OF THE INVENTION

The present disclosure generally relates to fluid control devices such as gas or fluid regulators and, more particularly, to a fluid regulator having a pair of diaphragms engaging a control element and a redundant seal between the pair of diaphragms.

DESCRIPTION OF THE PRIOR ART

The pressure at which typical fluid (e.g., gas or liquid) distribution systems supply gas may vary according to the demands placed on the system, the climate, the source of supply, and/or other factors. However, most end-user facilities equipped with gas appliances such as furnaces, ovens, etc., require the gas to be delivered in accordance with a predetermined pressure, and at or below a maximum capacity of a gas regulator. Therefore, gas regulators are implemented in these distribution systems in order to ensure that the delivered gas meets the requirements of the end-user facilities. Conventional gas regulators generally include a closed-loop control actuator for sensing and controlling the pressure of the delivered gas.

Fluid regulators typically employed in such gas distribution systems are generally well known in the art. One type of fluid regulator is a single stage pressure regulator, which acts to reduce the incoming or source pressure to the outlet or delivery pressure in a single step. Another type of fluid regulator is a dual stage regulator, which reduces the inlet pressure to the outlet pressure in two steps.

In pressure regulators, a number of environmental and/or mechanical factors can affect regulator performance. Accordingly, it may be desirable to provide a fluid or gas regulator exhibiting reduced or minimized adverse effects due to environmental and/or mechanical factors.

In some high pressure or harsh environment regulators, metal diaphragms are employed to extend useful life of the regulator. In some other high pressure or harsh environment regulators dual metal diaphragms are employed to further extend the useful life of the regulator.

SUMMARY

In accordance with a first exemplary aspect, a fluid regulator includes a regulator body having a fluid inlet and a fluid outlet connected by a fluid flow path, a portion of the regulator body forming a first chamber, an orifice being disposed in the fluid flow path and leading to a seat. A control element is disposed within the fluid flow path and shiftable between an open position spaced away from the seat and a closed position seated against the seat. The control element is arranged to respond to fluid pressure changes to control flow of a process fluid through the orifice. An actuator is attached to the regulator body, the actuator being operatively coupled to the control element and arranged to respond to fluid pressure changes in the fluid outlet to move the control element between the open position and the closed position to control flow of the process fluid through the orifice. The control element is operatively coupled to a diaphragm that includes a resilient redundant diaphragm sandwiched between two metal diaphragms.

In accordance with a second exemplary aspect, a method of reducing leaks in a regulator includes providing a fluid regulator having a regulator body including a fluid inlet and a fluid outlet connected by a fluid flow path. The regulator has an orifice disposed in the fluid flow path and a seat disposed in the orifice. A control element is disposed within the fluid flow path, the control element being shiftable between an open position spaced away from the seat and a closed position seated against the seat. The control element is arranged to respond to fluid pressure changes to control flow of a process fluid through the orifice. The regulator has an actuator attached to the regulator body, the actuator being operatively coupled to the control element and arranged to respond to fluid pressure changes to move the control element between the open position and the closed position to control flow of the process fluid through the orifice. A first metal diaphragm is provided and coupled by a radially inward portion of the diaphragm to the control element. A second resilient diaphragm is provided and coupled by a radially inward portion of the second diaphragm to the control element. A third metal diaphragm is provided and coupled by a radially inward portion of the third diaphragm to the control element. The second diaphragm comprises a resilient material and the second diaphragm is located between the first diaphragm and the third diaphragm.

In further accordance with any one or more of the foregoing first or second aspects, a dual stage regulator and/or method may further include any one or more of the following preferred forms.

In some preferred forms, the resilient material comprises PTFE. In other embodiments, other resilient materials or other flexible elastomers may be employed.

In other preferred forms, each of the first diaphragm, the second diaphragm, and the third diaphragm includes a radially inward portion operatively coupled to the control element and the radially inward portion of the first diaphragm is spaced axially from the radially inward portion of the third diaphragm by a radially inward portion of the second diaphragm. The radially inward portion of the second diaphragm may have a thickness of between 0.010 in and 0.001 in, preferably a thickness of between 0.007 in and 0.003 in, and more preferably a thickness of about 0.005 in.

In yet other preferred forms, each of the first diaphragm, the second diaphragm, and the third diaphragm includes a substantially planar center portion and an annular planar skirt portion. The first diaphragm, the second diaphragm, and the third diaphragm are held together by force and friction. In other embodiments, the first, second and third diaphragms may be held together by adhesives or by molding techniques.

In yet other preferred forms, a spring bears against a diaphragm plate, the spring being positioned to bias the control element toward the closed position.

In yet other preferred forms, an outer gasket is located proximate the annular planar skirt portion and an inner gasket is located proximate the planar center portion.

In yet other preferred forms, the outer gasket and the inner gasket comprise upper and lower gaskets.

DETAILED DESCRIPTION

Although the following text sets forth a detailed description of one or more exemplary embodiments of the invention, it should be understood that the legal scope of the invention is defined by the words of the claims set forth at the end of this patent. The following detailed description is to be construed as exemplary only and does not describe every possible embodiment of the invention, as describing every possible embodiment would be impractical, if not impossible. Numerous alternative embodiments could be implemented, using either current technology or technology developed after the filing date of this patent, and such alternative embodiments would still fall within the scope of the claims defining the invention.

Figure 1:
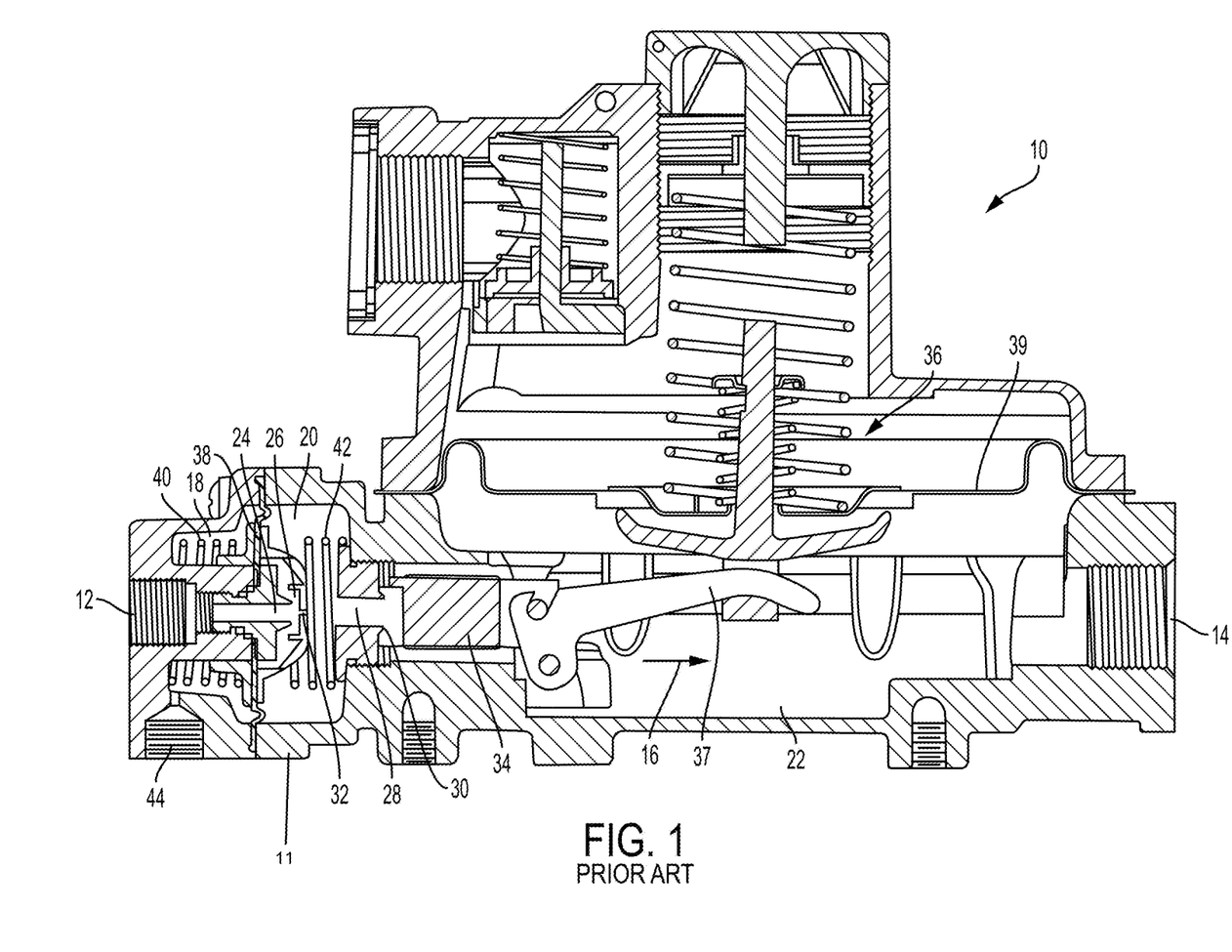
FIG. 1 is a cross-sectional view of a conventional regulator assembled in accordance with the teachings of the prior art.

Referring now to the drawings, FIG. 1 illustrates a conventional fluid regulator 10. The fluid regulator 10 includes a regulator body 11, a fluid inlet 12, and a fluid outlet 14, which are connected by a fluid flow path 16 which extends generally through the body 11. The fluid regulator is generally divided into a number of chambers, including a first chamber 18, a second chamber 20, and a third chamber 22. The fluid regulator 10 includes a first orifice 24 disposed in the fluid flow path 16 and leading to a first seat 26, and a second orifice 28 disposed in the fluid flow path 16 and leading to a second seat 30. A first control element 32 is disposed within the fluid flow path 16 and is shiftable between an open position (as shown in FIG. 1) in which the first control element is spaced away from the first seat 26, and a closed position in which the first control element is seated against the first seat 26 (in which the control element 16 would be positioned to the left of the open position of FIG. 1). The first control element 32 is arranged to respond to fluid pressure changes to control flow of a process fluid through the first orifice. A second control element 34 is disposed within the fluid flow path 16 and is shiftable between an open position (as shown in FIG. 1) in which the second stage control element 34 is spaced away from the second seat 30, and a closed position in which the second control element 34 is seated against the second seat 30.

The fluid regulator 10 includes an actuator 36 which is attached the regulator body 11. The actuator 36 is attached to or otherwise operatively coupled to the second control element 34, and is arranged to respond to fluid pressure changes in the fluid outlet 14 to move the second control element 34 between the open position and the closed position, in order to control flow of the process fluid through the second orifice 28. The actuator 36 may be conventional, and moves a lever 37 operatively coupled to the second control element 34 in order to open or close the second control element 34, depending on pressure conditions in the chamber 22. The actuator 36 includes a diaphragm, load springs, and a suitable stem or other suitable linkage as would be known. The first control element 32 is operatively coupled to a diaphragm 38, and the diaphragm 38 forms a pressure boundary between the chambers 18 and 20 when the first control element 32 is in the closed position. A spring 40 is disposed in the chamber 18 and bears against the control element 32 and applies a biasing load to the control element toward the open position, while another spring 42 is disposed in the chamber 20 and applies a biasing load to the control element 32 toward the closed position.

In operation, the inlet 12 is exposed to a supply pressure $P_i$, while the outlet 14 is exposed to an outlet or operating pressure $P_o$, which is the operating pressure required by the devices located downstream requiring gas at the lower operating pressure. The inlet pressure $P_i$ is generally higher than the outlet or operating pressure $P_o$. Typically, the chamber 18 is in flow communication with a vent 44 to atmosphere, and consequently the chamber 18 is at atmospheric pressure $P_a$. Finally, the chamber 20 is typically at a middle pressure $P_m$ between the inlet pressure and the outlet pressure. During operation, the inlet pressure is typically sufficiently high to keep the first control element 32 in the open position as shown in FIG. 1. If the inlet pressure drops sufficiently, then the pressure within the chamber 20 bearing against the diaphragm 38, with the assistance of the spring 42, causes the control element 32 to shift to the left toward, or to, the closed position.

When the pressure in the chamber 22 drops, meaning pressure at the gas devices downstream has dropped, the load springs in the actuator 36, which load springs bear against a diaphragm 39 of the actuator 36, overcome the gas pressure against the diaphragm. Consequently, the actuator moves the stem and/or diaphragm plate downward, rotating the lever 37 in a direction to move the second control element 34 away from the seat 30, feeding additional gas into the chamber 22. Conversely, when the pressure in the chamber 22 increases, the actuator causes the second control element 34 to move toward, or to, the seat 30, lowering the pressure on the chamber 22.

Figure 2:
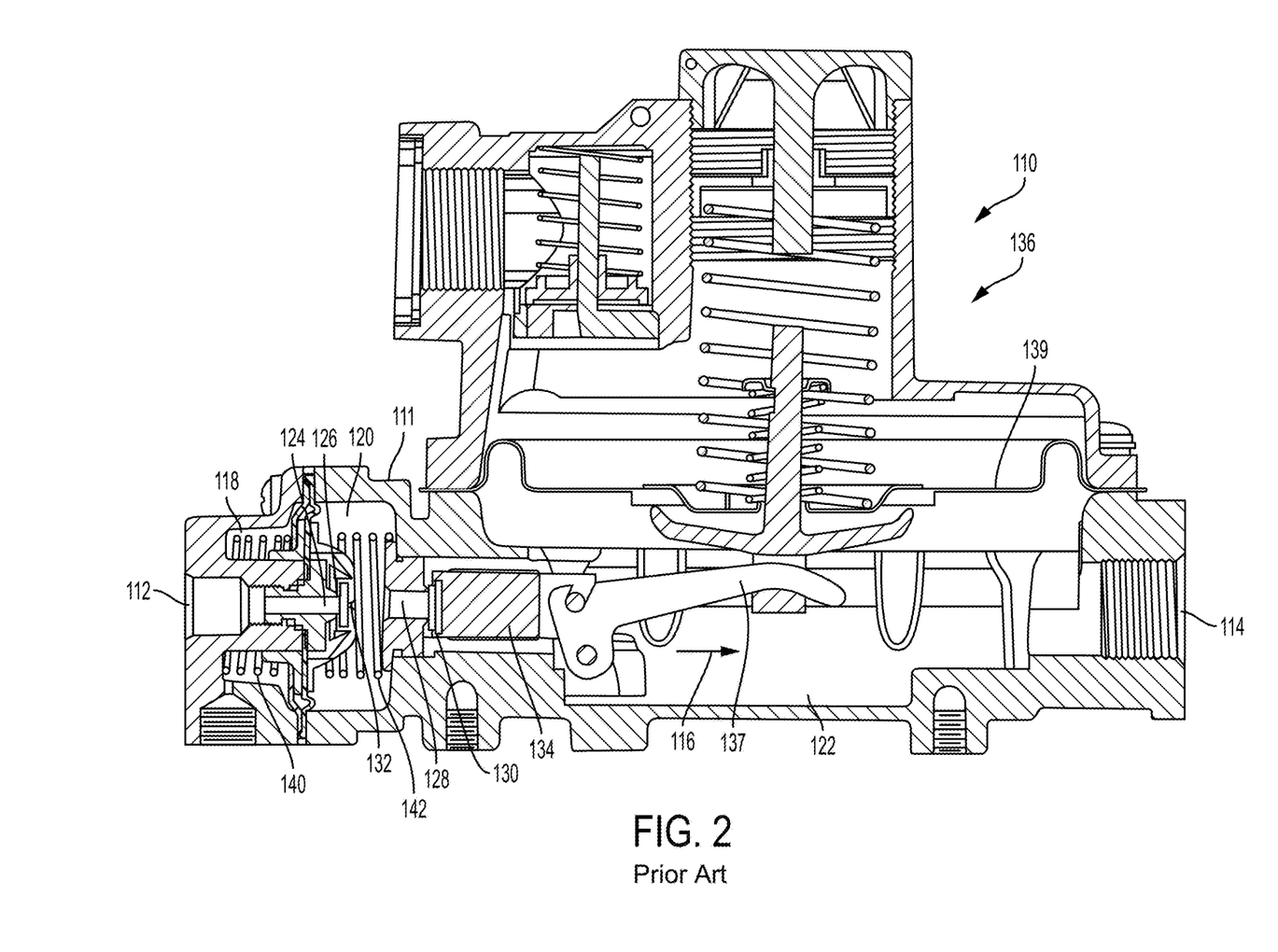
FIG. 2 is a cross-sectional view of a regulator incorporating a dual diaphragm assembly assembled with the teachings of the prior art.

FIG. 2 illustrates another conventional fluid regulator 110 having two diaphragms. For ease of reference, and to the extent possible, the same or similar components will retain the same reference numbers as outlined above with respect to the conventional fluid regulator discussed above, although the reference numbers will be increased by 100. The fluid regulator 110 includes a regulator body 111 and includes a fluid inlet 112 and a fluid outlet 114, which are connected by a fluid flow path 116 which extends generally through the body 111. It will be understood that fluid flows through the fluid regulator 110 in a downstream direction toward the right when viewing the drawings, from an upstream end oriented toward the inlet 112 toward a downstream and oriented toward the outlet 114. The fluid regulator 110 again is generally divided into a number of chambers, including a first chamber 118, a second chamber 120, and a third chamber 122. The fluid regulator 110 includes a first orifice 124 disposed in the fluid flow path 116 and leading to a first seat 126, and a second orifice 128 disposed in the fluid flow path 116 and leading to a second seat 130. The second seat 130 is formed by a second orifice fitting. In the example shown, the second orifice includes a tapered inlet.

A first stage control element 132 is disposed within the fluid flow path 16 and is shiftable between an open position (similar to that shown in FIG. 1, in which the first control element 132 is spaced away from the first seat 126, and a closed position in which the first control element 132 is seated against the first seat 126 (as shown in FIG. 2). As with the regulator discussed above, the first control element 132 is arranged to respond to fluid pressure changes to control flow of a process fluid through the first orifice 124.

A second control element 134 is disposed within the fluid flow path 116 and is shiftable between an open position (similar to that shown in FIG. 1) in which the second control element 134 is spaced away from the second seat 130, and a closed position in which the second control element 134 is seated against the second seat 130 (as shown in FIG. 2). The fluid regulator 110 includes an actuator 136 which is attached the regulator body 111. The actuator 136 is attached to or otherwise operatively coupled to the second control element 134, and is arranged to respond to fluid pressure changes in the fluid outlet 114 to move the second control element 134 between the open position and the closed position, in order to control flow of the process fluid through the second orifice 128. The actuator 136 may be conventional, and moves a lever 137 operatively coupled to the second control element 134 in order to open or close the second control element 134, depending on pressure conditions in the chamber 122. The actuator 136 includes a diaphragm 139, load springs, and a suitable stem or other suitable linkage as would be known, in order to convert the up and down movement of the diaphragm into appropriate movement of the second control element 134.

The first control element 132 is operatively coupled to a first diaphragm 138, and the first diaphragm 138 forms a pressure boundary between the chambers 118 and 120 when the first control element 132 is in the closed position of FIG. 2. The first control element 132 also coupled to a second diaphragm 150, and the second diaphragm 150 is disposed in the chamber 118. A spring 140 also is disposed in the chamber 118, and bears against the first control element 132 in order to apply a biasing load to the first control element 132 toward the open position. Another spring 142 is disposed in the chamber 120 and applies a biasing load to the first control element 132 toward the closed position.

Figure 3:
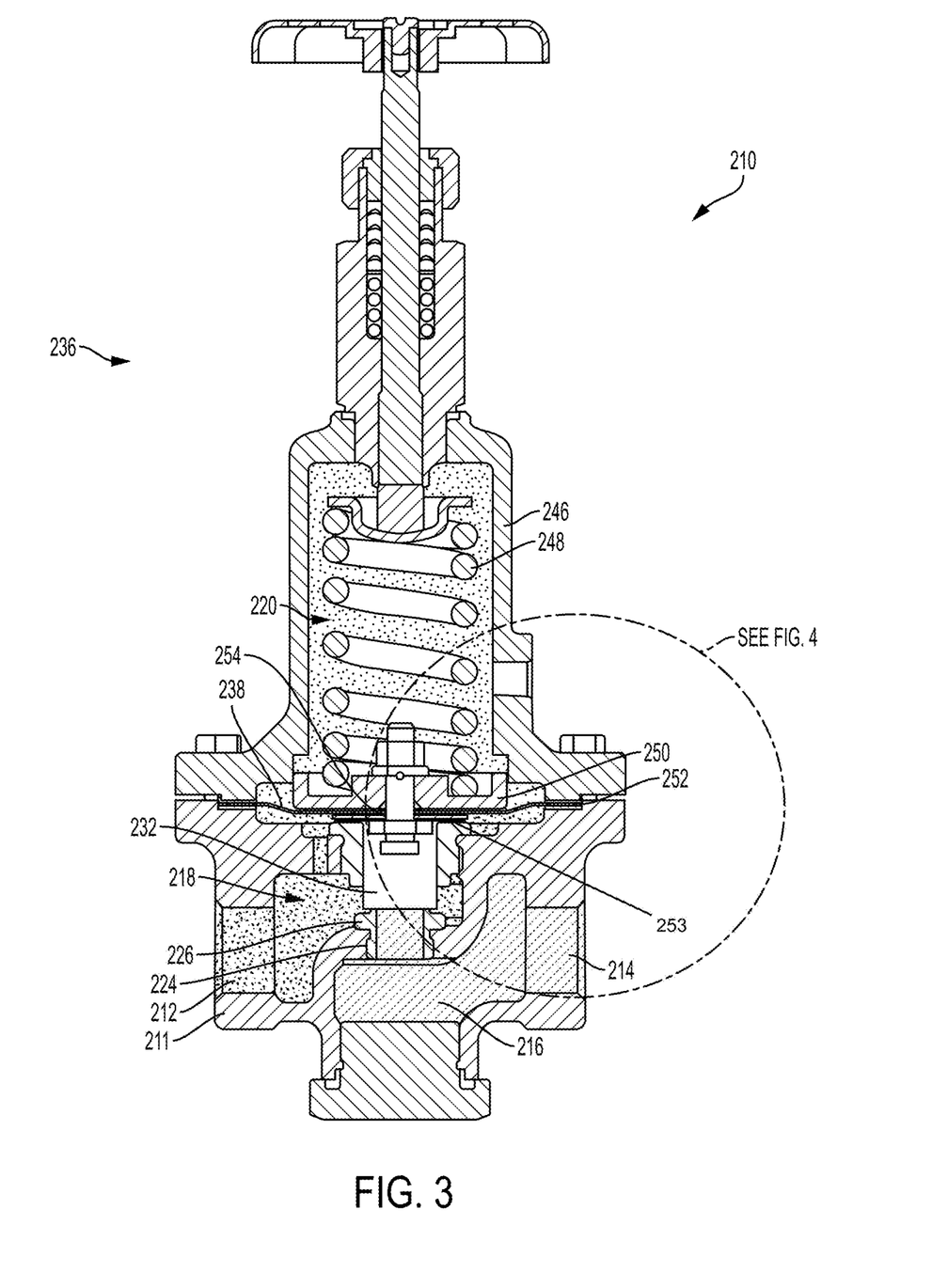
FIG. 3 is a cross-sectional view of a regulator having a dual metal diaphragm and a redundant seal between the two metal diaphragms, assembled in accordance with the teachings of the disclosure.

Referring now to FIG. 3, a single-stage, pressure-loaded, backpressure regulator 210 is illustrated that is constructed in accordance with the teachings of the disclosure. However, the principles described with respect to the embodiment illustrated in FIG. 3 apply equally to the embodiment illustrated in FIG. 2. In other embodiments, the disclosed diaphragm may be used in a single-stage, pressure loaded, relief valve or in a pressure reducing regulator.

In some high pressure and/or harsh operating environment, the regulator 210 may employ a dual metal diaphragm and a resilient diaphragm sandwiched between the two metal diaphragms to form a resilient redundant seal. The dual metal diaphragm and the resilient diaphragm are discussed in more detail below.

A regulator body 211 includes an inlet 212 and an outlet 214, which are connected by a flow path 216. Generally, fluid flows through the fluid regulator 210 in a downstream direction toward the right when viewing the drawings, from an upstream end oriented proximate the inlet 212 toward a downstream end proximate the outlet 214. The fluid regulator again is generally divided into a number of chambers, including a first chamber 218 and a second chamber 220 that are separated by a diaphragm 238. The fluid regulator 210 includes an orifice 224 disposed in the fluid flow path 216 and a seat 226 disposed in the orifice 224.

A control element 232 is disposed within the fluid flow path 216 and is shiftable between an open position (similar to that shown in FIG. 1), in which the control element 232 is spaced away from the seat 226, and a closed position in which the control element 232 is seated against the seat 226. The control element 232 is arranged to respond to fluid pressure changes to control flow of a process fluid through the orifice 224.

An actuator 236 is attached to the regulator body 211. The actuator 236 includes an actuator housing 246 that houses an actuator spring 248. The actuator spring 248 is connected to a diaphragm plate 250. The diaphragm 238 is compressed between the actuator housing 246 and the regulator body 211 at a radially outer edge 252. Similarly, the diaphragm 238 is compressed between the diaphragm plate 250 and a plate cap 253 at a radially inner edge 254.

Figure 4:
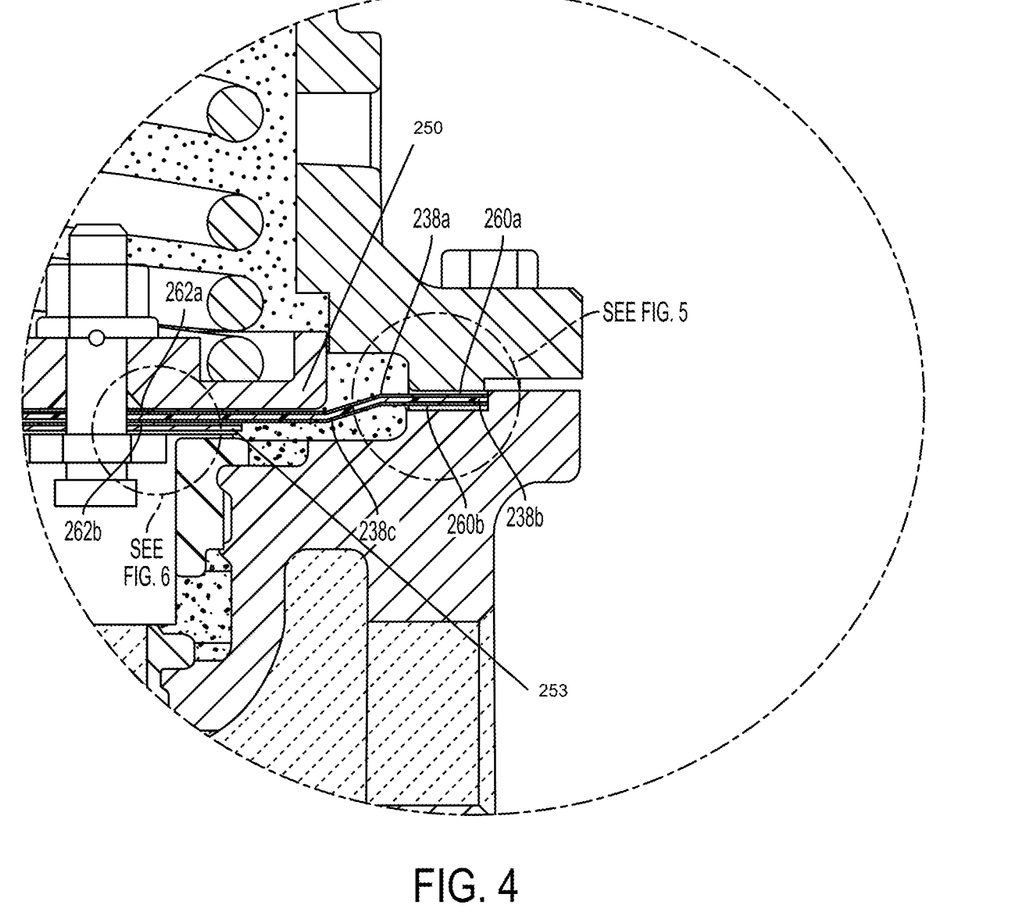
FIG. 4 is a close up cross-sectional view of area SEE FIG. 4 from FIG. 3.

Turning now to FIG. 4, the diaphragm 238 is illustrated in more detail. FIG. 4 is a close up view of area "SEE FIG. 4" from FIG. 3. The diaphragm 238 is formed by three separate diaphragms 238a, 238b, 238c. The first and third diaphragms 238a, 238c may be made of a metal material. The second diaphragm 238b may be made of a resilient material, such as PTFE or another flexible elastomer. A radially outer upper gasket 260a is located between the actuator housing 246 and the first diaphragm 238a. A radially outer lower gasket 260b is located between the regulator body 211 and the third diaphragm 238c. Similarly, a radially inner upper gasket 262a is located between the diaphragm plate 250 and the first diaphragm 238a and a radially inner lower gasket 262b is located between the plate cap 253 and the third diaphragm 238c.

Figure 5:
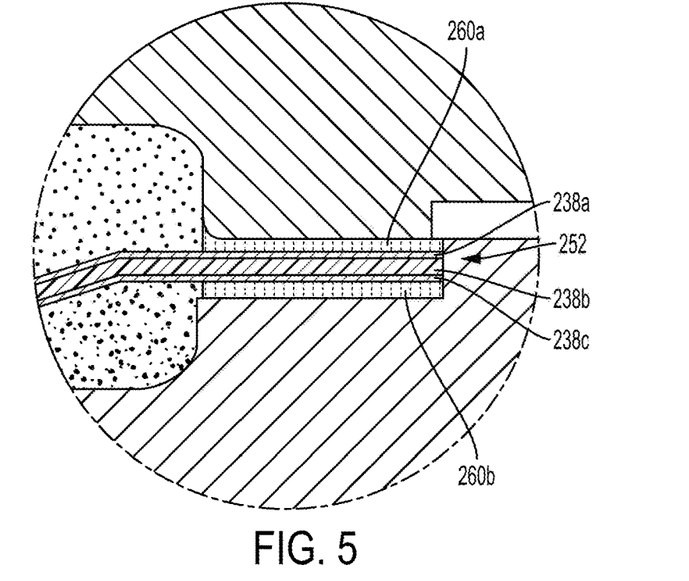
FIG. 5 is a close up cross-sectional view of area SEE FIG. 5 from FIG. 4.
Figure 6:
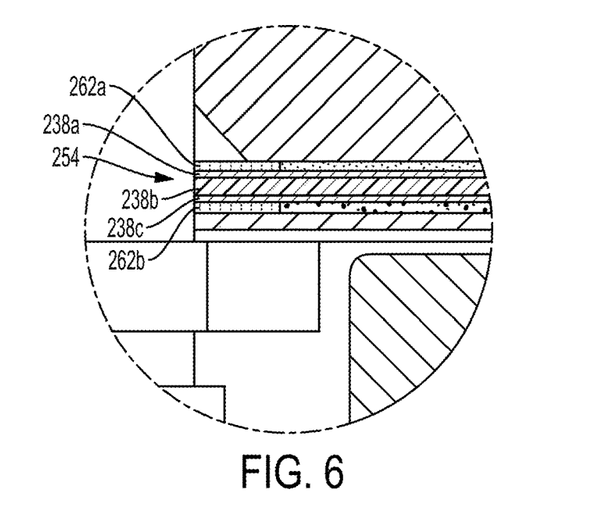
FIG. 6 is a close up cross-sectional view of area SEE FIG. 6 from FIG. 4.

FIGS. 5 and 6 illustrate the diaphragms 238a, 238b, 238c, and the gaskets 260a, 260b, 262a, 262b from areas "SEE FIG. 5" and "SEE FIG. 6" respectively of FIG. 4.

The three diaphragms 238a, 238b, 238c advantageously provide exceptional durability and leak protection. More specifically, the resilient redundant second diaphragm 238b seals the gap between the first metal diaphragm 238a and the third metal diaphragm 238c. In some embodiments, the resilient redundant second diaphragm 238b may be made from PTFE. In other embodiments, the resilient redundant second diaphragm 238b may be made from other flexible elastomers or other resilient materials. In some embodiments, the resilient redundant second diaphragm 238b may have a thickness of between 0.001 in and 0.010 in, preferably between 0.003 in and 0.007 in, and more preferably about 0.005 in. These thicknesses advantageously balance leak prevention without affecting the operating properties of the metal first diaphragm 238a and the metal third diaphragm 238c. More specifically, the thicknesses disclosed advantageously minimize direct tolerance stackup of the diaphragms 238a, 238b, 238c, while providing good leak protection. The resilient redundant diaphragm 238b is compressed at both the radially inner edge 254 and at the radially outer edge 252 to produce the redundant seal. The resilient material, such as PTFE, has been found to have little effect on wide open capacity of the regulator 210, in contrast to traditional gasket material. Furthermore, by locating the resilient redundant second diaphragm 238b between the first metal diaphragm 238a and the third metal diaphragm 238c, the chemical and temperature compatibility of the metal material remains unaffected, while at the same time providing two seals, one at the radially outer edge 252 and one at the radially inner edge.

Figure 7:
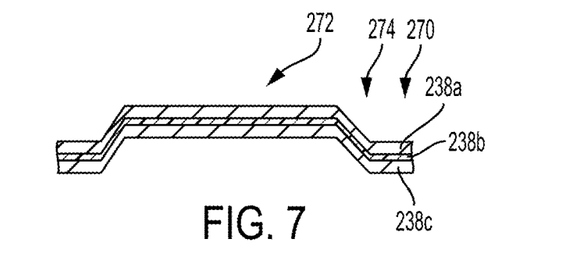
FIG. 7 is a cross-sectional view of the diaphragms of FIG. 3.

In the illustrated embodiment, each diaphragm 238a, 238b, 238c includes a radially outward portion 270 and a radially inward portion 272 (see FIG. 7). The radially inward portion 272 of the first diaphragm 238a is spaced axially from the radially inward portion 272 of the third diaphragm 238c by a radially inward portion 272 of the second diaphragm 238b. The diaphragms 238a, 238b, 238c also include a middle portion 274 disposed between the radially outer portion 270 and the radially inner portion 272. The radially outer portion 270 and the radially inner portion 272 may be substantially planar in a natural state, the radially outer portion 270 and the radially inner portion 272 being located in substantially parallel planes. The middle portion 274 may be substantially cone shaped, being angled relative to both the radially outer portion 270 and to the radially inner portion 272, thereby creating a cavity formed by the chamfered middle portion 274. The first diaphragm 238a, the second diaphragm 238b, and the third diaphragm 238c are held together by force and friction. In other embodiments, the diaphragms may be held together by adhesive or by a molding process.

While certain representative embodiments and details have been shown for purposes of illustrating the invention, it will be apparent to those skilled in the art that various changes in the methods and apparatus disclosed herein may be made without departing from the scope of the invention.

What is claimed:

1. A fluid regulator comprising: a regulator body having a fluid inlet and a fluid outlet connected by a fluid flow path; an orifice disposed in the fluid flow path and leading to a seat; a control element disposed within the fluid flow path and shiftable between an open position spaced away from the seat and a closed position seated against the seat, the control element being arranged to respond to fluid pressure changes to control flow of a process fluid through the orifice; an actuator attached to the regulator body, the actuator being operatively coupled to the control element; wherein the control element is operatively coupled to a first diaphragm, to a second diaphragm, and to a third diaphragm, the first, second, and third diaphragms being stacked upon one another, the first and third diaphragms comprising metal, and the second diaphragm comprising a resilient material, the second diaphragm being disposed between the first and third diaphragms, and the first diaphragm, the second diaphragm, and the third diaphragm each include a substantially planar center portion and an annular planar skirt portion that are connected by a substantially cone-shaped middle portion; an outer gasket located proximate the annular planar skirt portion of the first diaphragm or the third diaphragm; and an inner gasket located proximate the substantially planar center portion of the first diaphragm or the third diaphragm; wherein the outer gasket comprises a radially outer upper gasket located proximate the annular planar skirt portion of the first diaphragm, and wherein the inner gasket comprises a radially inner upper gasket located proximate the substantially planar center portion of the first diaphragm, further comprising a radially outer lower gasket located proximate the annular planar skirt portion of the third diaphragm, and a radially inner lower gasket located proximate the substantially planar center portion of the third diaphragm.

2. The regulator of claim 1, wherein the resilient material comprises PTFE.

3. The regulator of claim 1, wherein each of the first diaphragm, the second diaphragm, and the third diaphragm includes a radially inward portion operatively coupled to the control element.

4. The regulator of claim 3, wherein, the radially inward portion of the first diaphragm is spaced axially from the radially inward portion of the third diaphragm by a radially inward portion of the second diaphragm.

5. The regulator of claim 4, wherein the radially inward portion of the second diaphragm has a thickness of between 0.010 in and 0.001 in.

6. The regulator of claim 5, wherein the thickness is between 0.007 in and 0.003 in.

7. The regulator of claim 6, wherein the thickness is about 0.005 in.

8. The regulator of claim 1, and including:
a spring bearing against a diaphragm plate, the spring being positioned to bias the control element toward the closed position.

9. A method of reducing leaks in a regulator, the method comprising:
providing a fluid regulator having a regulator body including a fluid inlet and a fluid outlet connected by a fluid flow path, the regulator further having an orifice disposed in the fluid flow path, and a seat disposed in the orifice, a control element disposed within the fluid flow path, the control element being shiftable between an open position spaced away from the seat and a closed position seated against the seat, the control element being arranged to respond to fluid pressure changes to control flow of a process fluid through the orifice, and the regulator further having an actuator attached to the regulator body;
providing a first metal diaphragm;
coupling a radially inward portion of the diaphragm to the control element;
providing a second resilient diaphragm;
providing a third metal diaphragm;
providing a radially outer upper gasket between the first metal diaphragm and an actuator housing of the actuator;
providing a radially inner upper gasket between the first metal diaphragm and a diaphragm plate coupled to the first metal diaphragm;
providing a radially outer lower gasket between the third metal diaphragm and the regulator body;
providing a radially inner lower gasket between the third metal diaphragm and a diaphragm cap coupled to the third metal diaphragm; and
coupling a radially inward portion of the third diaphragm to the control element,
wherein the second diaphragm comprises a resilient material and the second diaphragm is located between the first diaphragm and the third diaphragm.

10. The method of claim 9, wherein the regulator includes a spring bearing against a diaphragm plate, the spring biasing the control element toward the closed position.

11. The method of claim 9, wherein the radially outer upper gasket is located proximate an annular planar skirt portion of the first metal diaphragm, the radially outer lower gasket is located proximate an annular skirt portion of the third metal diaphragm, the radially inner upper gasket is located proximate a substantially planar center portion of the first metal diaphragm, and the radially inner lower gasket is located proximate a substantially planar center portion of the third metal diaphragm.

12. The method of claim 9, wherein the first diaphragm, the second diaphragm, and the third diaphragm each include a substantially planar center portion and an annular planar skirt portion that are connected by a middle portion.

13. The method of claim 12, wherein the middle portion is angled relative to the substantially planar center portion and an annular planar skirt portion.

14. The method of claim 12, wherein the middle portion is substantially cone-shaped.

15. A method of reducing leaks in a regulator, the method comprising: providing a fluid regulator having a regulator body including a fluid inlet and a fluid outlet connected by a fluid flow path, the regulator further having an orifice disposed in the fluid flow path, and a seat disposed in the orifice, a control element disposed within the fluid flow path, the control element being shiftable between an open position spaced away from the seat and a closed position seated against the seat, the control element being arranged to respond to fluid pressure changes to control flow of a process fluid through the orifice, and the regulator further having an actuator attached to the regulator body; providing a first metal diaphragm; coupling a radially inward portion of the diaphragm to the control element; providing a second resilient diaphragm; providing a third metal diaphragm; coupling a radially inward portion of the third diaphragm to the control element; providing each of the first diaphragm, the second diaphragm, and the third diaphragm with a substantially planar center portion and an annular planar skirt portion that are connected by a middle portion angled relative to the substantially planar center portion and the annular planar skirt portion; and providing an outer gasket and an inner gasket, the outer gasket being located proximate the annular planar skirt portion and the inner gasket being located proximate the substantially planar center portion, wherein the second diaphragm comprises a resilient material and the second diaphragm is located between the first diaphragm and the third diaphragm; wherein the outer gasket comprises a radially outer upper gasket located proximate the annular planar skirt portion of the first diaphragm, and wherein the inner gasket comprises a radially inner upper gasket located proximate the substantially planar center portion of the first diaphragm, further comprising a radially outer lower gasket located proximate the annular planar skirt portion of the third diaphragm, and a radially inner lower gasket located proximate the substantially planar center portion of the third diaphragm.

16. The method of claim 15, wherein the outer gasket and the inner gasket comprise upper and lower gaskets.

17. The method of claim 15, wherein one of the upper gasket and the lower gasket comprises an outer gasket proximate the annular planar skirt portion of the first metal diaphragm or the third metal diaphragm; and the other of the upper gasket and the lower gasket comprises an inner gasket proximate the substantially planar center portion of the first metal diaphragm or the third metal diaphragm.

18. The method of claim 15, wherein the middle portion is substantially cone-shaped.

* * * * *